Patented Sept. 19, 1922.

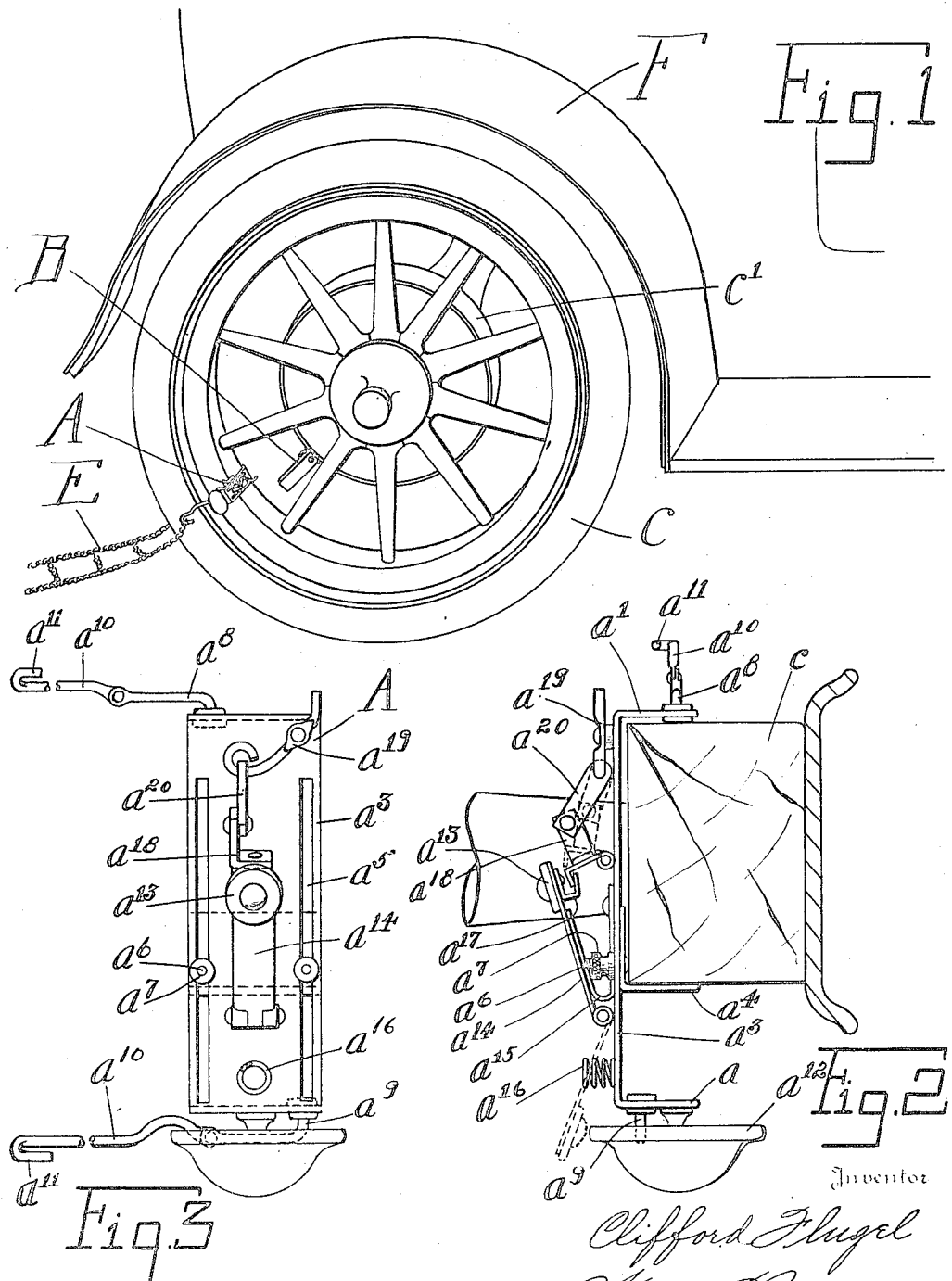

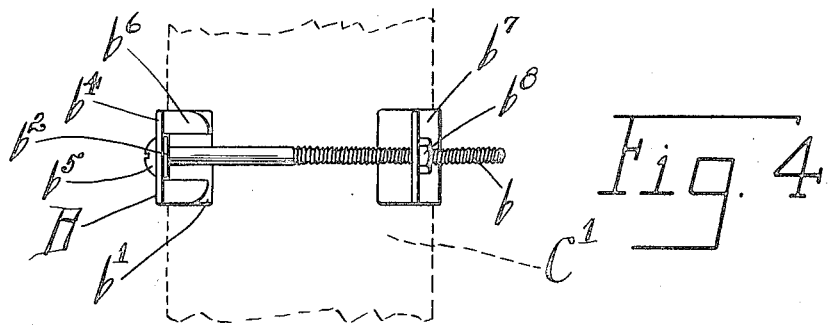
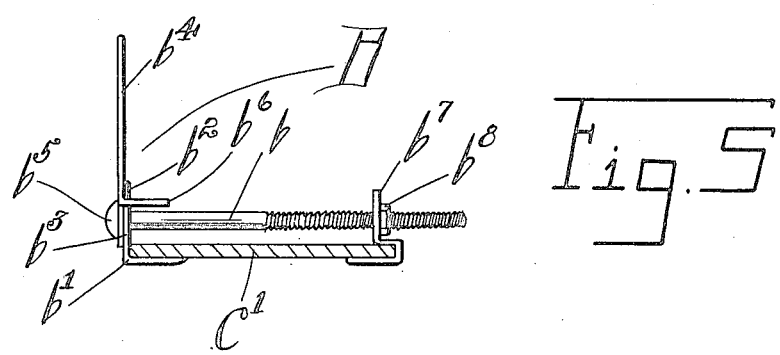
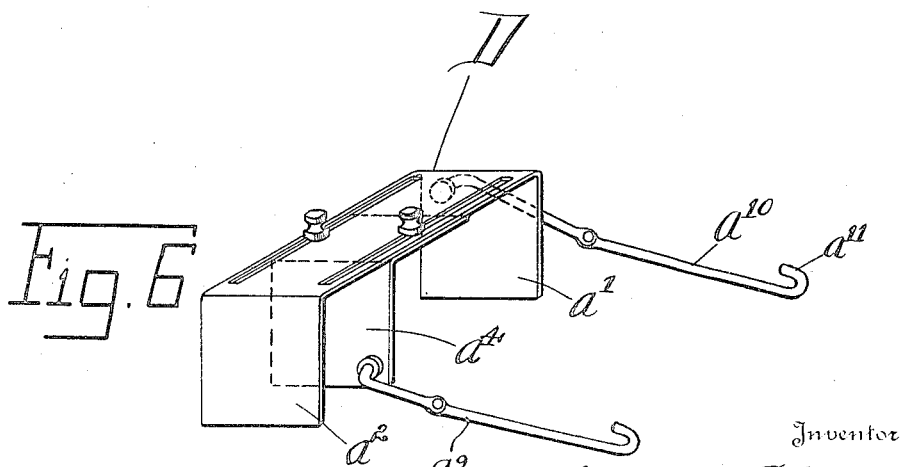

1,429,677

UNITED STATES PATENT OFFICE.

CLIFFORD FLUGEL, OF CINCINNATI, OHIO.

ANTISKID-CHAIN-APPLYING DEVICE.

Application filed August 5, 1921. Serial No. 489,967.

*To all whom it may concern:*

Be it known that I, CLIFFORD FLUGEL, a citizen of the United States of America, and a resident of Cincinnati, in the county of Hamilton and State of Ohio, have invented a new and useful Improvement in an Antiskid-Chain-Applying Device, of which the following is a specification.

An object of my invention is to provide a device to be employed in applying antiskid chains to vehicle tires adapted to apprise the operator of the fact that the chain is disposed substantially about the tire.

Another object of my invention is to provide a device for the purpose stated that may be adjusted for use on various vehicles having fellies of different sizes.

Another object is to provide a simple and efficient device for the purposes stated.

These and other objects are attained by the means described herein and disclosed in the accompanying drawings, in which Fig. 1 is a perspective view showing an automobile wheel having a device embodying my invention mounted thereupon.

Fig. 2 is a transverse sectional view of a wheel felly having a device embodying my invention mounted thereupon.

Fig. 3 is a plan view of my device.

Figs. 4 and 5 are views of a trip device adapted to release the signalling means of my invention.

Fig. 6 is an auxiliary chain applying device.

My invention comprises a clip A adapted to be mounted upon a felly of an automobile wheel C and carrying a bell $a^{12}$, together with means to sound the bell after the wheel has substantially made one complete revolution.

The trip device B is adapted to be mounted at any suitable place, such as upon the brake band housing C', and to release the bell actuating mechanism when the clip A passes thereby.

The clip A is substantially U-shaped in construction, the branches $a'$ and $a^2$ being fixed upon the body $a^3$ thereof and adapted to extend over a felly $c$ of the wheel C. An adjustable bracket $a^4$ is mounted upon the body of the clip and is adapted to be fixedly retained at various positions thereupon by any suitable means such as by providing slots $a^5$ longitudinally of the body $a^3$ and by mounting bolts $a^6$ on the bracket $a^4$, which bolts extend through the slots $a^5$ and have mounted upon them suitable retaining means such as the nuts $a^7$. The adjustable bracket $a^4$ is employed solely to make the device adjustable to fellies of various widths, and if desired, may be dispensed with, and the branches $a'$ and $a^2$ then serving to secure the clip upon the fellies. Arms $a^8$ and $a^9$ are pivotally mounted on the branches $a'$ and $a^2$ respectively, and each arm has pivotally mounted upon it a finger $a^{10}$, the free end of which is bent upon itself to form a hook $a^{11}$. When providing the clip $a$ with the bracket $a^4$ the arm $a^9$ may be mounted upon the bracket $a^4$ if desired as shown in Fig. 6. The arms are mounted upon the branches at the diametrically opposed corners thereof. This relation of parts causes the clip to bind firmly upon the felly when the weight of the chains is placed upon the arms. A bell $a^{12}$ is mounted upon the branch $a^2$. A bell clapper $a^{13}$ is mounted on one end of the clapper bolt $a^{14}$, the other end of which bolt is pivotally mounted upon the body $a^3$. A U-shaped spring $a^{15}$ has one of it branches mounted upon the body $a^3$ and its other branch is adapted to engage the clapper bolt $a^{14}$. The clapper bolt is adapted to be moved into and held in engagement with the spring $a^{15}$, thereby tensioning the spring $a^{15}$ and the spring is adapted, when released, to move the clapper about its pivotal mounting and cause the clapper to strike the bell $a^{12}$. A spring $a^{16}$ is interposed in the path of the clapper bolt and serves to yieldingly resist movement of the clapper towards the bell. The spring $a^{16}$ is of such tension that the clapper bolt $a^{13}$ will be moved into engagement with the bell $a^{12}$ immediately the clapper is released from under the influence of the spring $a^{15}$, and after the sounding of the bell, to retain the clapper out of engagement with the bell. The free end of the clapper bolt has mounted upon it a catch $a^{17}$. A hook $a^{18}$ is pivotally mounted upon the body $a^3$ and is adapted to engage the catch $a^{17}$ and to retain the clapper bolt in engagement with the spring $a^{15}$. A trigger $a^{19}$ is pivotally mounted upon the body $a^3$ and is adapted to extend beyond the branch $a'$. A link $a^{20}$ pivotally connects one end of the trigger $a^{19}$ and the hook $a^{18}$. When the trigger is revolubly actuated about its pivotal mounting, the movement thereof is transmitted by means of the link $a^{20}$ to the hook $a^{18}$, thereby releasing the catch $a^{17}$.

A tripping device B comprises a bolt $b$ having an angle bracket $b'$ mounted on one end. A lug $b^2$ is formed on the side plate $b^3$ of the bracket and extends substantially diametrically to the bolt $b$. A plate $b^4$ is mounted upon the bolt $b$ intermediate the head $b^5$ thereof, and the bracket $b'$ and has formed upon it adjacent its one end, the lugs $b^6$ extending substantially parallel with the axis of the bolt $b$, and one of which lugs $b^6$ is adapted to assume a position on opposite sides of the lug $b^2$ formed on the bracket $b'$. The bolt $b$ has a screw threaded section upon which is slidably mounted a second bracket $b^7$ and which screw threaded section is engaged by a nut $b^8$. Both of the brackets have a side plate extending substantially parallel with the bolt $b$. The last referred to side plates are adapted to be mounted upon and to lie upon the housing $C'$ of the brake band. The nut $b^8$ is employed to secure the device B upon the brake band housing. The plate $b^4$ is adapted to be engaged by the trigger $a^{18}$ and to cause the trigger to be moved about its pivotal mounting. If desired the plate $b^4$ may be dispensed with and the lug $b^2$ on the bracket $b'$ made of sufficient length to contact the trigger.

The auxiliary clip D is constructed similar to the first mentioned clip A, except that it has no bell or bell actuating mechanism mounted upon it, and therefore no tripping mechanism is operative thereupon.

The clip A is mounted upon a wheel felly so as to dispose the bell upon the outer side of the wheel, thereby avoiding possible engagement of the bell with any parts of the vehicle when the wheel is revolved. The clip D is mounted upon the felly of the wheel on the opposite side of the vehicle at substantially the same relative position to the wheel as is the clip A mounted. The chains E of the respective wheels are then attached to the hooks $a^{11}$ of the clips A and D, and the bell clapper mechanism mounted upon clip A is set to be actuated as the clip A passes the trip device B. The operator then moves the vehicle F forwardly and the chains are drawn about the tire. The operator continues to move the vehicle until the trip device B releases the hammer $a^{13}$ and the bell $a^{12}$ is sounded. The vehicle is then stopped and both chains E being then in position to have their ends joined upon one another, the chains are released from the clips A and D and the ends of the chains secured upon one another. The clips are then removed from the wheel fellies.

What I claim is:

1. In an anti-skid chain applying device the combination of means adapted to be mounted on a wheel and to carry an anti-skid chain about the wheel during the movement of the wheel, and means adapted to apprise the operator of the substantial positioning of the anti-skid chain upon the wheel.

2. In an anti-skid chain applying device the combination of means adapted to be removably mounted on a vehicle felly, signalling means, and means to actuate the signalling means upon the substantial positioning of the anti-skid chain upon a vehicle wheel.

3. In an anti-skid chain applying device the combination of a clip adapted to be mounted on a vehicle wheel, a bell mounted on the clip, a hammer on the clip adapted to sound the bell, arms on the clip adapted to removably retain an anti-skid chain upon a wheel, and means adapted to be engaged by the clip during the movement of the wheel whereby the hammer is caused to sound the bell.

4. In an anti-skid chain applying device the combination of a clip adapted to be mounted on a vehicle wheel, a bell mounted on the clip, a bell clapper pivotally mounted on the clip, means adapted to move the clapper into engagement with the bell, a catch normally retaining the clapper out of engagement with the bell and under the influence of the said means, means mounted on the clip adapted to render the catch inoperative upon engagement therewith.

5. In an anti-skid chain applying device the combination of a clip adapted to be mounted on a vehicle wheel, arms mounted on the clip adapted to have an anti-skid chain mounted removably thereupon, a bell mounted on the clip, a bell clapper pivotally mounted on the clip, a spring adapted to yieldingly resist movement of the bell clapper into engagement with the bell, a second spring adapted to move the clapper into engagement with the bell, a catch normally retaining the clapper in engagement with the second mentioned spring and tensioning said second mentioned spring, a trigger adapted to release the clapper from the catch, and a trip device adapted to be mounted adjacent the vehicle wheel and to engage the trigger, whereby the clapper will sound the bell.

In testimony whereof, I have hereunto subscribed my name this 3rd day of August, 1921.

CLIFFORD FLUGEL.